C. F. HILL,

Assignor to himself and G. D. HILL.

Shoes.

No. 8,531. Reissued Jan. 7, 1879.

Witnesses,

W. A. Butler.

Dr. L. H. Barclay.

Inventor

Chas. F. Hill.

by

R. D. Williams.

Attorney.

UNITED STATES PATENT OFFICE.

CHARLES F. HILL, OF BALTIMORE, MARYLAND, ASSIGNOR TO HIMSELF AND GEORGE D. HILL, OF SAME PLACE.

IMPROVEMENT IN SHOES.

Specification forming part of Letters Patent No. 158,275, dated December 29, 1874; Reissue No. 6,281, dated February 9, 1875; Reissue No. 8,531, dated January 7, 1879; application filed November 21, 1878.

*To all whom it may concern:*

Be it known that I, CHARLES F. HILL, of Baltimore city, State of Maryland, have invented certain new and useful Improvements in Shoes; and I hereby declare the same to be fully, clearly, and exactly described as follows, reference being had to the accompanying drawings, in which—

Figure 1:
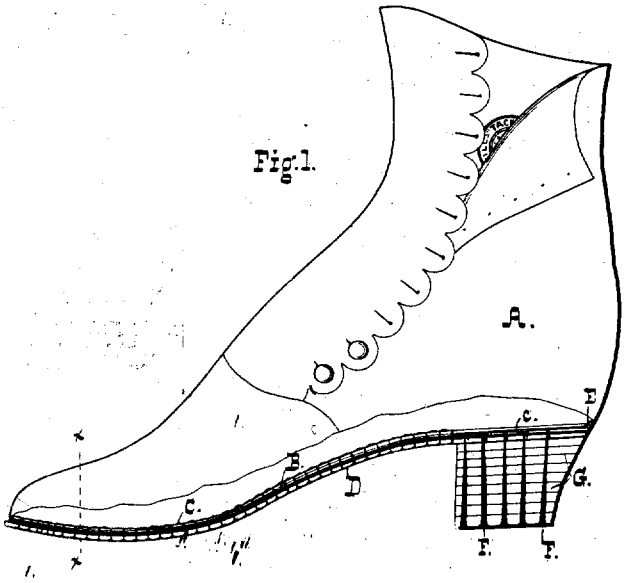
Figure 2:
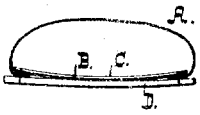
Figure 3:
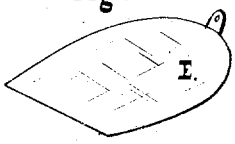

Figure 1 is a side elevation of a shoe embodying my invention, a part being broken away to illustrate certain details of construction. Fig. 2 is a transverse sectional view on line *x x*, Fig. 1; and Fig. 3 is a perspective view of a metallic clinching-plate.

This invention relates to certain improvements in the manufacture of shoes; and it consists in certain details of construction and methods of manufacture not here necessary to enumerate, as they are made the subjects of claims based upon the following description.

In the accompanying drawings, A represents the shoe-upper, which is tacked, as usual, over a middle sole, B. D is the outer sole, which, with the tacked middle sole, clamps the edge of the upper. C is an insole, which is placed upon the lasting-sole B, and sewed to the same and to the outer sole all the way around as far as the heel, but no farther, the heel part of the insole being left loose to admit of clinching the heel-nails, as hereinafter described.

The nails or tacks used in securing the parts of the shoe are clinched by means of a metallic plate, (see Fig. 3,) of proper shape and size to be inserted under the insole, which plate turns over the points of the tacks or nails as they strike it and clinches them in the material immediately below.

The plate E is preferably of hard steel, and is illustrated as of a shape to fit under the loose heel portion of the insole, so that when the heel-pieces G are to be fastened to the shoe (a last being placed within the latter) the nails F are turned over and clinched at their points, as just described.

The loose heel-piece *c* of the insole is slitted and undercut at the terminus of the line of stitching, so that if the stitching be continued too far the thread is simply drawn through the slit, and does not secure the part *c* to the heel part of the outer sole, and thereby admits of the insertion of the plate for clinching the heel-nails. A little tang may be formed on the metallic plate to facilitate its removal; but it is not essential.

In shoes of ordinary manufacture, the nails used in lasting and in securing the heel are covered, if at all, by a thin strip of light material, which soon wears out and leaves the exposed tacks to soil the stocking and disturb the comfort of the wearer. Even before the strip wears out, it, being pervious to moisture, permits the rusting of the tacks from perspiration, and the discoloration of the strip incident thereupon soils the stocking.

My invention obviates this difficulty. The lasting and heel tacks are concealed and covered in such manner as to effectually prevent annoyance from them, while the shoe, as a whole, is a stronger and better article.

Inasmuch as the lasting-sole is permanently covered and concealed, my invention admits of the utilization for it of an inferior quality of leather.

Having thus described my invention, what I claim as new, and desire to secure by Letters Patent, is—

1. A shoe having its lasting-nails clinched in the upper surface of the lasting-sole and covered by an insole, which is secured to the outer sole by a line of stitching, as set forth.

2. A shoe in which a middle sole receiving the lasting-nails is covered by an insole, and the whole united by a line of stitching passing through the outer sole, the upper, the middle sole, and the insole, substantially as set forth.

3. A shoe having its insole united to its outer sole by a line of stitching extending around the shoe as far as the heel, the insole covering the points of the lasting-nails, which are clinched in the upper surface of the lasting-sole, substantially as described.

4. A shoe having its heel-nails clinched in the lasting-sole and covered by a part of the insole, the front portion of which is secured to the outer sole by a line of stitching, substantially as described.

5. A shoe having its insole united to its outer sole by a line of stitching extending as far as the heel, the heel part of the insole being a loose flap covering the clinched points of the heel-nails, substantially as described.

6. The removable metallic heel-plate E, extending across the sole of the shoe, and conforming thereto in shape, and adapted for insertion between the sole receiving tacks or nails and the insole, for the purpose of clinching the points of the nails upon the former, substantially as described.

CHARLES F. HILL.

Witnesses:
C. PEEBLES,
S. M. BERNARD.